United States Patent [19]

Ihara et al.

[11] Patent Number: 5,717,528
[45] Date of Patent: Feb. 10, 1998

[54] LENS BARREL

[75] Inventors: Yuji Ihara, Tokyo; Hitoshi Imanari, Yokohama, both of Japan

[73] Assignee: Nikon Corporation, Tokyo, Japan

[21] Appl. No.: 756,677

[22] Filed: Nov. 26, 1996

[30] Foreign Application Priority Data

Nov. 28, 1995 [JP] Japan .................. 7-309328

[51] Int. Cl.$^6$ .................................... G02B 15/14
[52] U.S. Cl. .................. 359/694; 359/703; 359/704
[58] Field of Search ........................... 359/694, 703, 359/704, 819

[56] References Cited

U.S. PATENT DOCUMENTS 5,249,082  9/1993  Newman ........................... 359/813
5,424,873  6/1995  Uziie et al. ....................... 359/813

FOREIGN PATENT DOCUMENTS 5-36410   5/1993  Japan .
6-174990  6/1994  Japan .
6-265766  9/1994  Japan .

Primary Examiner—David C. Nelms
Assistant Examiner—Ricky Mack

[57] ABSTRACT

A lens barrel includes a lens holding barrel holding a lens, a containing barrel containing the lens holding barrel therein, a plurality of inwardly directed projections provided on the inner peripheral surface of the containing barrel, and a plurality of groups of outwardly directed projections provided on the outer peripheral surface of the lens holding barrel, each of the plurality of groups of outwardly directed projections having the same number of outwardly directed projections as the number of the inwardly directed projections, the plurality of inwardly directed projections bearing against respective ones of the outwardly directed projections in one group at a time to position the optical axis to the lens, virtual circles circumscribed on the outwardly directed projections in the respective groups having the same size in a plane perpendicular to the optical axis, the centers of the virtual circles lying at different positions.

8 Claims, 10 Drawing Sheets

LENS BARREL

BACKGROUND OF THE INVENTION

1. Field of the Invention

This invention relates to a lens barrel provided with a lens holding barrel holding a lens, and a containing barrel containing the lens holding barrel therein.

2. Related Background Art

Various propositions have heretofore been made regarding the adjustment of the eccentricity of a lens, and one of them is described, for example, in Japanese Laid-Open Utility Model Application No. 5-36410. In this example of the prior art, a suitable play or clearance is provided between the outer peripheral surface of a lens and the inner peripheral surface of a lens holding member holding the same, and a plurality of adjusting screws are made to bear against the lens from the outer peripheral direction of the lens holding member to thereby effect the adjustment of the eccentricity of the lens. Also, in another example of the prior art, Japanese Laid-Open Patent Application No. 6-265766, parallel light is passed through two lens systems and the result of the imaging thereof is image-processed to thereby calculate a correction amount. Thereafter, one of the lens systems is moved by an amount corresponding to the correction amount by the use of an adjusting jig to thereby effect the adjustment of the eccentricity of the lens.

However, in the example of the prior art described in Japanese Laid-Open Utility Model Application No. 5-36410, the adjusting screws directly press the lens, and this leads to the problem that the lens is oriented to any angular position with respect to the optical axis.

Also, the example of the prior art described in Japanese Laid-Open Patent Application No. 6-265766 is large-scaled in the apparatus itself and an increase in cost is unavoidable.

SUMMARY OF THE INVENTION

In view of such problems, the present invention has as its object to provide a lens barrel which enables highly accurate adjustment of the eccentricity of a lens to be effected by simple work without using a large-scale apparatus.

According to a first embodiment of the present invention for achieving the above object, there is provided a lens barrel provided with a lens holding barrel holding a lens, and a containing barrel containing the lens holding barrel therein, characterized in that:

- a plurality of inwardly directed projections are provided on the inner peripheral surface of the containing barrel;
- a plurality of groups of the same number of outwardly directed projections as the plurality of inwardly directed projections are provided on the outer peripheral surface of the lens holding barrel;
- the plurality of inwardly directed projections bear against respective ones of the outwardly directed projections included in any one of the plurality of groups at a time to thereby position the optical axis of the lens;
- virtual circles circumscribed on the outwardly directed projections included in respective ones of the plurality of groups are circles of the same size perpendicular to the optical axis; and
- the centers of the respective virtual circles differ from one another.

According to a second embodiment of the present invention for achieving the above object, there is provided a lens barrel according to the first embodiment, characterized in that the circumferential interval between adjacent ones of the outwardly directed projections is greater than the circumferential width of the inwardly directed projections.

According to a third embodiment of the present invention for achieving the above object, there is provided a lens barrel provided with a lens holding barrel holding a lens, and a containing barrel containing the lens holding barrel therein, characterized in that:

- a plurality of outwardly directed projections are provided on the outer peripheral surface of the lens holding barrel;
- a plurality of groups of the same number of inwardly directed projections as the plurality of outwardly directed projections are provided on the inner peripheral surface of the containing barrel;
- the plurality of outwardly directed projections bear against respective ones of the inwardly directed projections included in any one of the plurality of groups at a time to thereby position the optical axis of the lens;
- virtual circles inscribed on the inwardly directed projections included in respective ones of the plurality of groups are circles of the same size perpendicular to the optical axis; and
- the centers of the respective virtual circles differ from one another.

According to a fourth embodiment of the present invention for achieving the above object, there is provided a lens barrel according to the third embodiment, characterized in that the circumferential interval between adjacent ones of the inwardly directed projections is greater than the circumferential width of the outwardly directed projections.

According to a fifth embodiment of the present invention for achieving the above object, there is provided a lens barrel according to the first, second, third or fourth embodiment, characterized in that one of the centers of the virtual circles coincides with the center of the optical axis of the lens.

BRIEF DESCRIPTION OF THE DRAWINGS

FIG. 8 is a front view of the lens holding barrel 3 when outwardly directed projections 3b bear against inwardly directed projections 4a.

FIG. 9 is a front view of the containing barrel 4 when the outwardly directed projections 3b bear against the inwardly directed projections 4a.

FIG. 10 is a cross-sectional view of the eccentricity adjusting mechanism 2 taken along the line III—III of FIG. 2 when the outwardly directed projections 3d bear against the inwardly directed projections 4a.

DESCRIPTION OF THE PREFERRED EMBODIMENTS

A lens barrel as an embodiment of the present invention will hereinafter be described with reference to the drawings.

Figure 1:
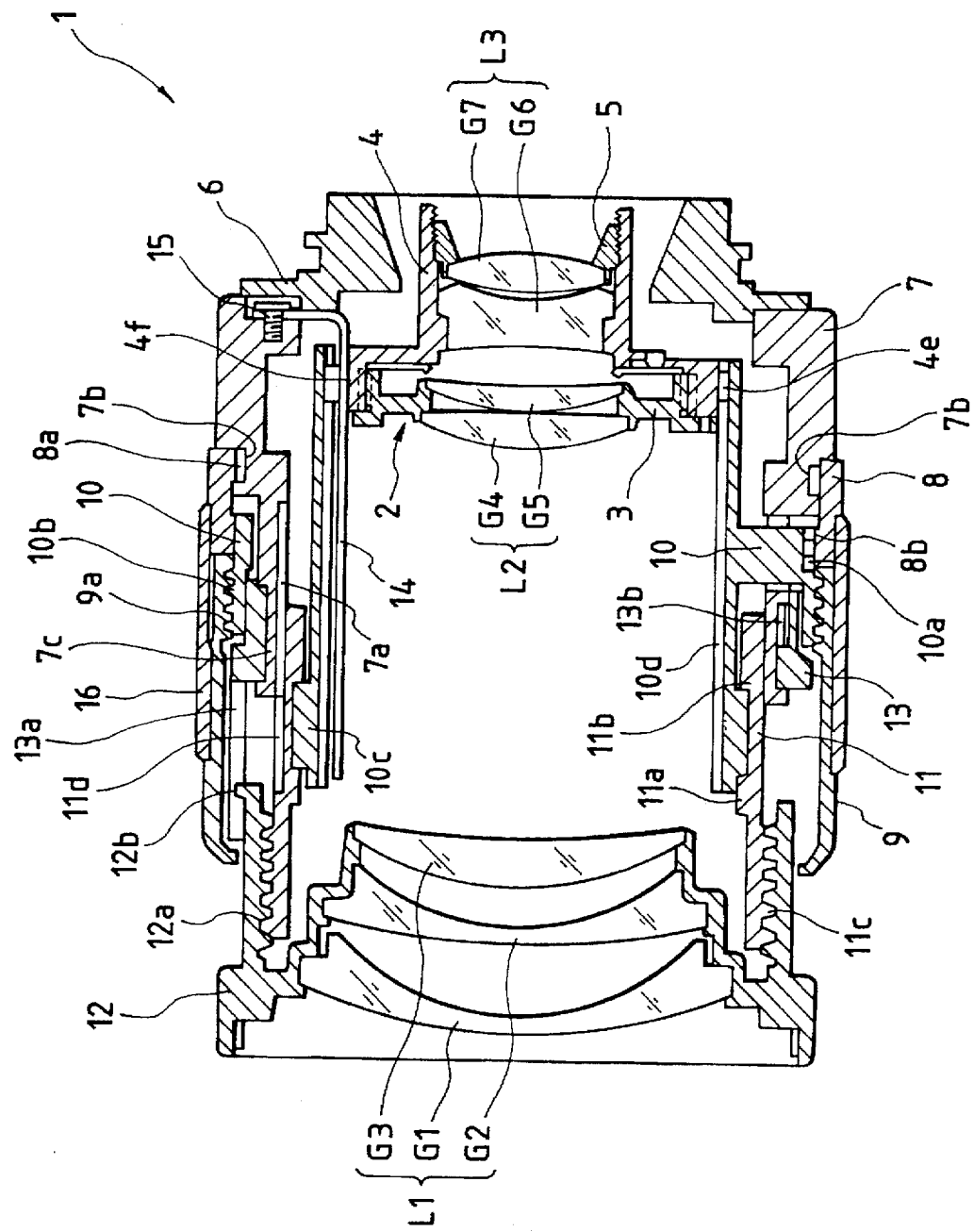
FIG. 1 shows the general construction of an embodiment of a lens barrel according to the present invention.

The General construction of the lens barrel 1 according to the present embodiment is as shown in FIG. 1, and an eccentricity adjusting mechanism which is a characteristic portion thereof will first be described. The eccentricity adjusting mechanism 2 is comprised of a lens holding barrel 3 holding a lens unit L2 (lenses G4 and G5), and a containing barrel 4 containing the lens holding barrel 3 therein. The containing barrel 4 holds a lens unit L3 (lenses G6 and G7) besides the lens holding barrel 3, and serves also as a lens holding barrel holding the lens unit L3. The lenses G6 and G7 are fixed to the containing barrel 4 by a screw in type keep ring 5.

Figure 2:
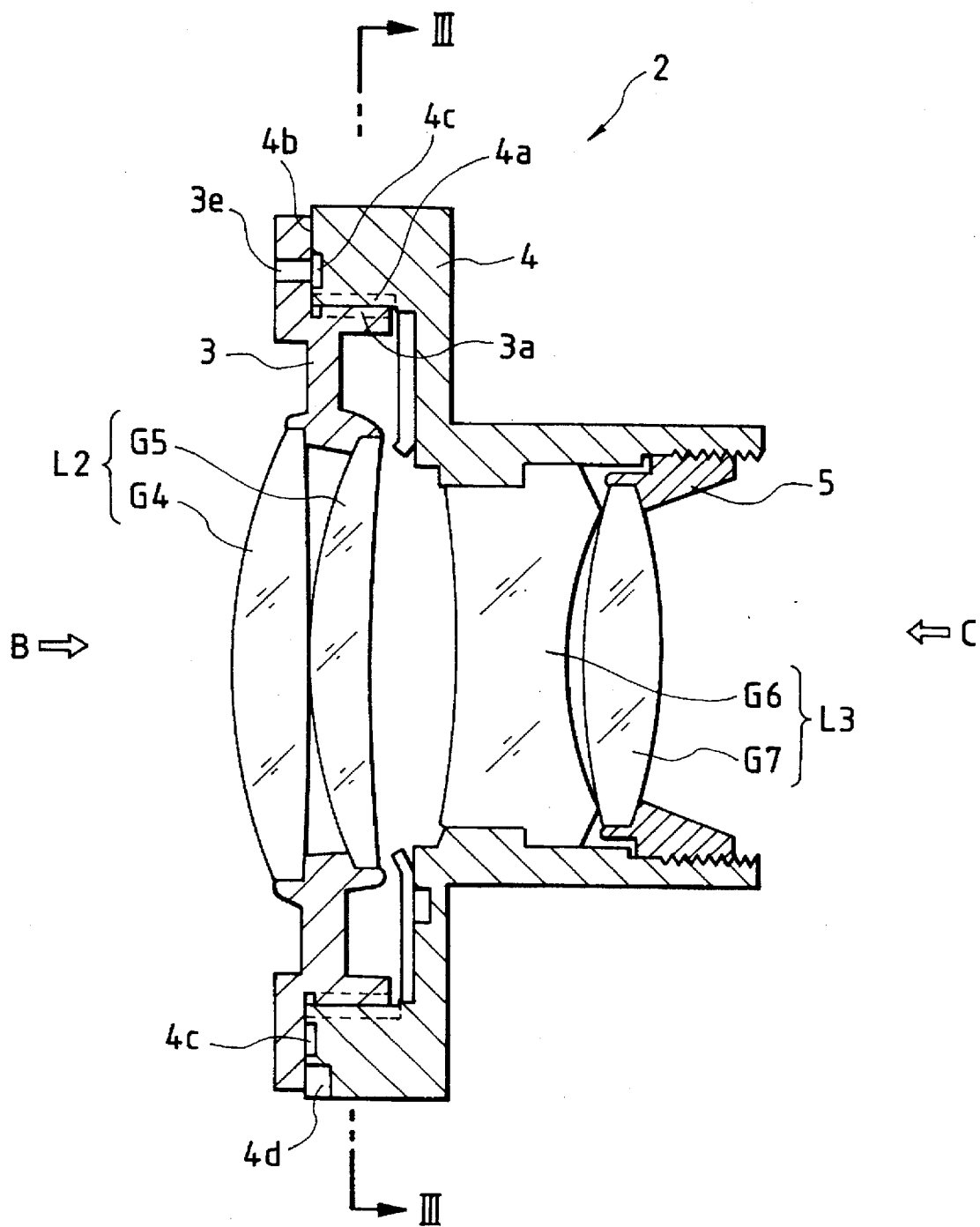
FIG. 2 is a longitudinal cross-sectional view of the eccentricity adjusting mechanism of the lens barrel of FIG. 1.
Figure 3:
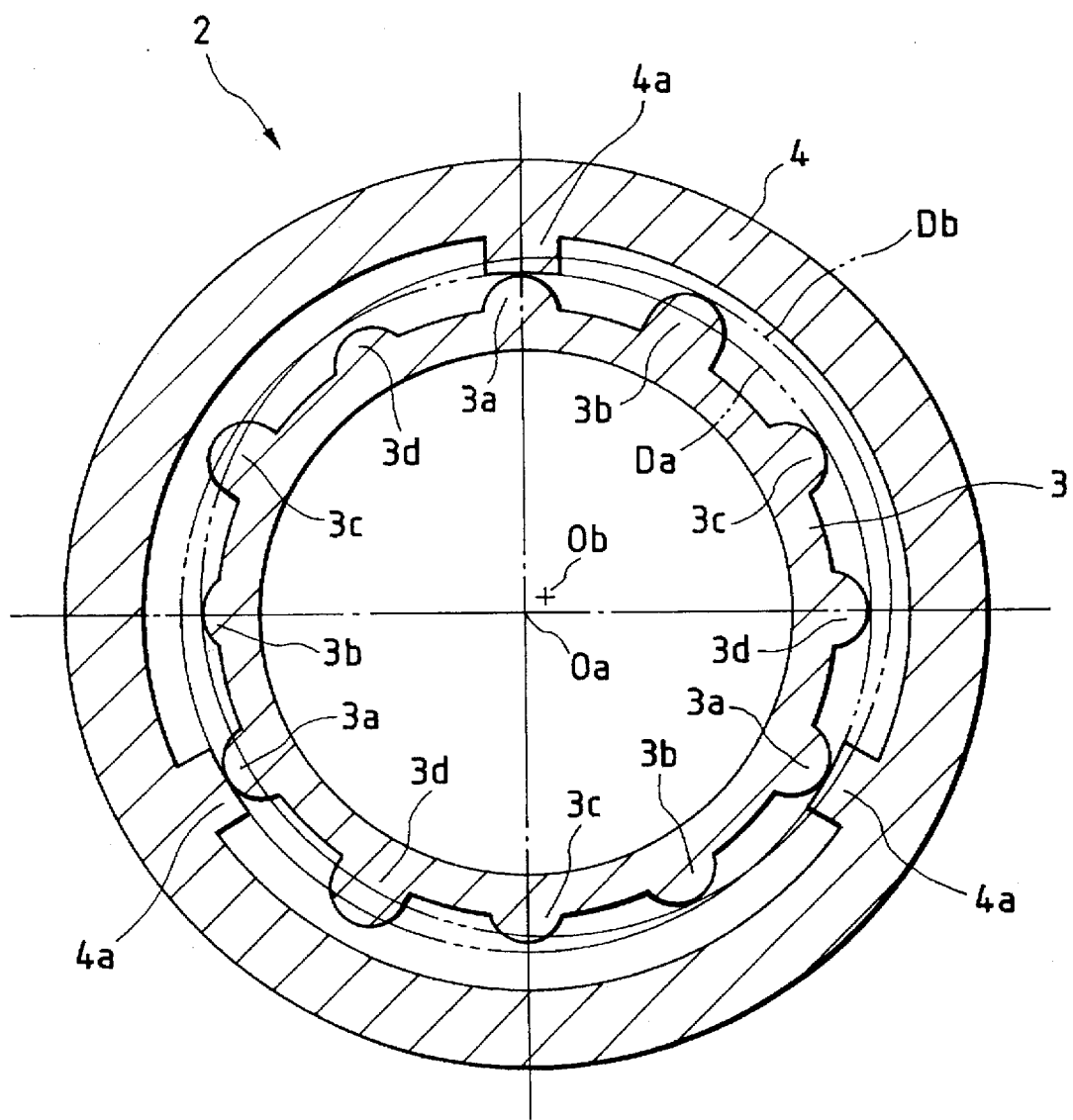
FIG. 3 is a cross-sectional view of the eccentricity adjusting mechanism taken along the line III—III of FIG. 2.

FIG. 2 is a longitudinal cross-sectional view of the eccentricity adjusting mechanism 2. FIG. 3 is a cross-sectional view of the eccentricity adjusting mechanism 2 taken along the line III—III of FIG. 2.

A plurality of (in the present embodiment, three) inwardly directed projections 4a are provided on the inner peripheral surface of the containing barrel 4, and a plurality of (in the present embodiment, four) groups of the same number of (three) outwardly directed projections 3x (x:a–d) as the plurality of inwardly directed projections are provided on the outer peripheral surface of the lens holding barrel 3. Virtual circles Dx (x:a–d) circumscribed on the outwardly directed projections included in respective ones of said groups are circles of the same size in a plane perpendicular to the optical axis of the lens unit L2. The centers Ox (x:a–d) of the virtual circles Dx differ from one another. In FIG. 3, there are shown a virtual circle Da circumscribed on three outwardly directed projections 3a and a virtual circle Db circumscribed on three outwardly directed projections 3b. The center Oa of the virtual circle Da lies on the optical axis of the lens unit L2 (in FIG. 3, the point at which two alternate long and short dash lines intersect each other). The center Ob of the virtual circle Db lies rightwardly obliquely upwardly of the center Oa of the virtual circle Da as viewed in FIG. 3. Each of the three outwardly directed projections 3a bears against the corresponding inwardly projected projection 4a to thereby effect the positioning of the lens holding barrel 3 (the positioning of the optical axis) relative to the containing barrel 4. In the present embodiment, the three inwardly directed projections 4a and the three outwardly directed projections 3a–3d in the respective Groups are disposed at intervals of 120°, whereas the numbers and intervals of these projections are not limited to those in the present embodiment, but may be set as required.

A circumferential groove 4c is formed in the end surface 4b of the containing barrel 4, and through-holes 3e are formed in the lens holding barrel 3 circumferentially equidistantly at three locations so as to overlap the circumferential groove 4c. A circumferential groove 4d of a predetermined length is formed in the edge of the containing barrel 4. The lens holding barrel 3 is fixed to the containing barrel 4 by an adhesive agent (the details of which will be described later) poured through the through-holes 3e and the circumferential groove 4d.

In FIGS. 2 and 3, the lens holding barrel 3 is already fixed to the containing barrel 4, and description will hereinafter be made of this fixing work and the step preceding the fixing work, i.e., the eccentricity adjusting work using the eccentricity adjusting mechanism 2 of the present embodiment.

Figure 4:
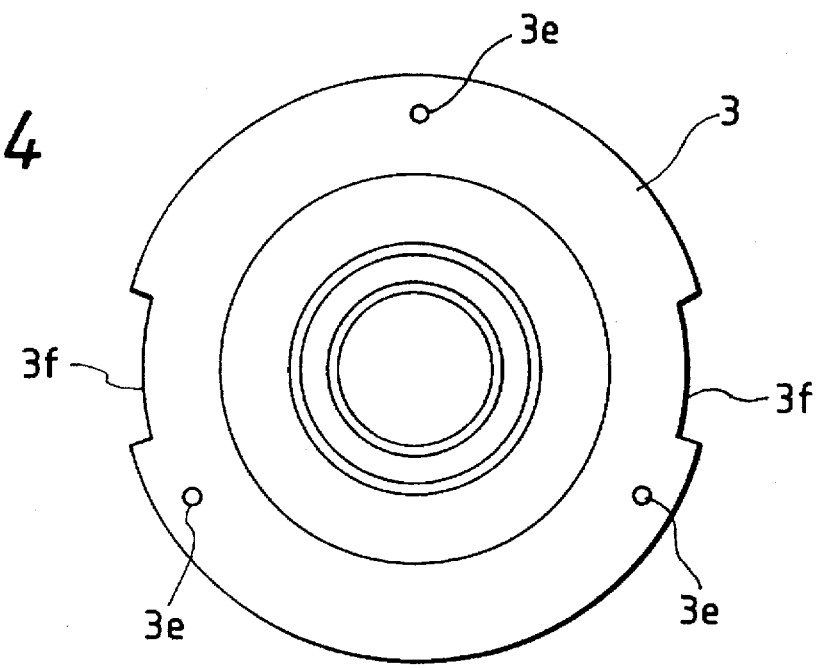
FIG. 4 is a front view of the lens holding barrel 3 of FIG. 2.
Figure 5:
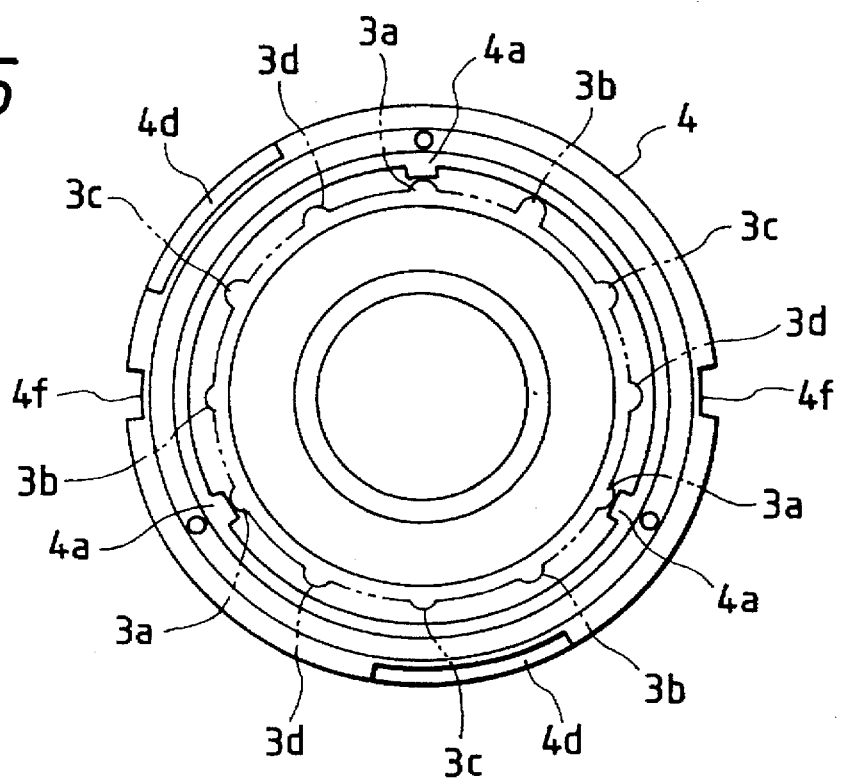
FIG. 5 is a front view of the containing barrel 4 of FIG. 2.
Figure 6:
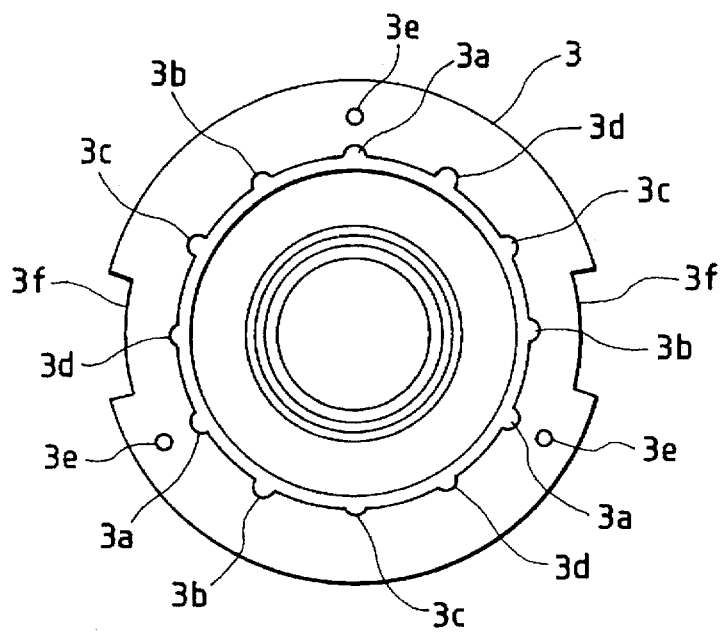
FIG. 6 is a rear view of the lens holding barrel 3 of FIG. 2.

First, the three inwardly directed projections 4a are made to bear against respective ones of the outwardly directed projections included in any one of the plurality of groups of outwardly directed projections 3a–3d at a time to thereby position the optical axis of the lens unit L2. In FIGS. 4 to 6, there is shown a state in which the three inwardly directed projections 4a bear against respective ones of the three outwardly directed projections 3a at a time. FIG. 4 is a front view of the lens holding barrel 3 (a view showing the state when only the lens holding barrel 3 is seen from the direction of arrow B in FIG. 2), FIG. 5 is a front view of the containing barrel 4 (a view showing the state when only the containing barrel 4 is seen from the direction of arrow B in FIG. 2), and FIG. 6 is a rear view of the lens holding barrel 3 (a view showing the state when only the lens holding barrel 3 is seen from the direction of arrow C in FIG. 2).

Figure 7:
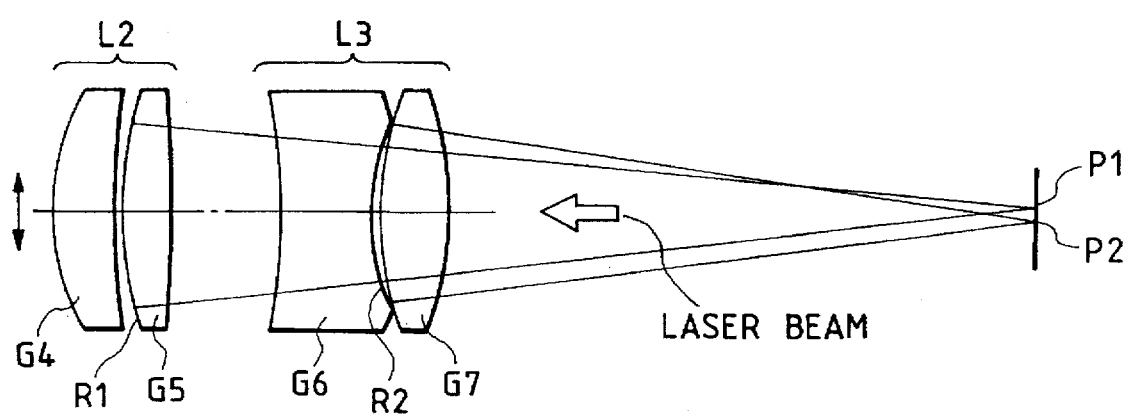
FIG. 7 is an illustration regarding an example of the measurement of the eccentricity of the lens barrel according to the present invention.

Next, a laser beam is applied to each of the surface R1 of the lens G5 and the surface R2 of the lens G6, and the reflected images (P1 and P2) are monitored on the same surface. Mutual eccentricity accuracy is required of these surfaces R1 and R2, and for example, it is necessary for the eccentricity accuracy to be within 0.01 mm. The state of measurement is shown in FIG. 7. A monitor device for monitoring the reflected images P1 and P2 and a laser beam applying device are already known and therefore need not be described in detail. If as the result of the monitoring of the reflected images P1 and P2, these images coincide with each other, the positioning is regarded as having been completed, and an instantaneous adhesive agent (for example, an adhesive agent of the ethyl cyanoacrylate base) is poured into the three through-holes 3e in the lens holding barrel 3 to thereby effect the temporal tacking of the lens holding barrel 3. Subsequently, a secondary adhesive agent (e.g. an adhesive agent of the epoxy base) is poured into the circumferential groove 4d of the containing barrel 4 to thereby completely fix the lens holding barrel 3 to the containing barrel 4. If the lens holding barrel 3 is temporally tacked to the containing barrel 4 in advance, there will not arise the problem that with the hardening of the secondary adhesive agent, the lens holding barrel 3 moves relative to the containing barrel 4. In the present embodiment, the depth of the circumferential groove 4c is about 0.04 mm and the width thereof is about 1 mm.

Figure 8:
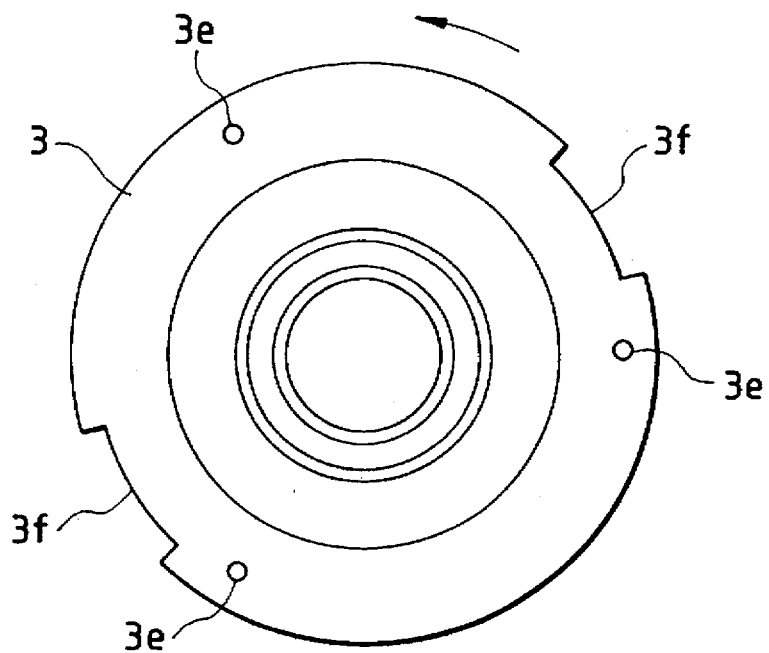
Figure 9:
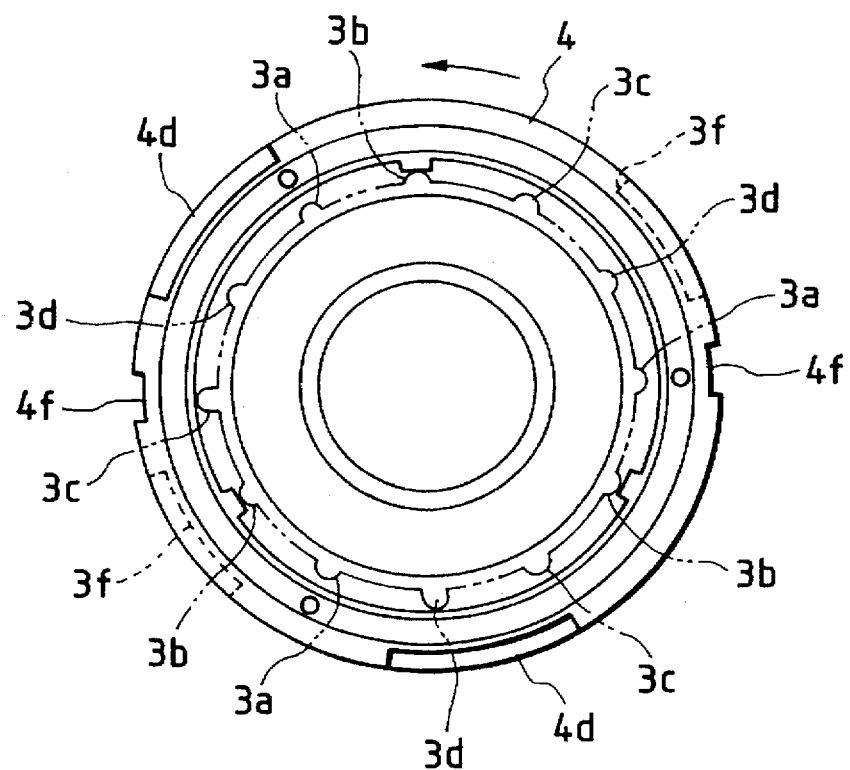

On the other hand, when the reflected images P1 and P2 do not coincide with each other, the lens holding barrel 3 is rotated to thereby make the next three outwardly directed projections bear against the corresponding inwardly directed projections 4a. FIGS. 8 and 9 show a state in which the three outwardly directed projections 3b have been selected. FIG.

Figure 10:
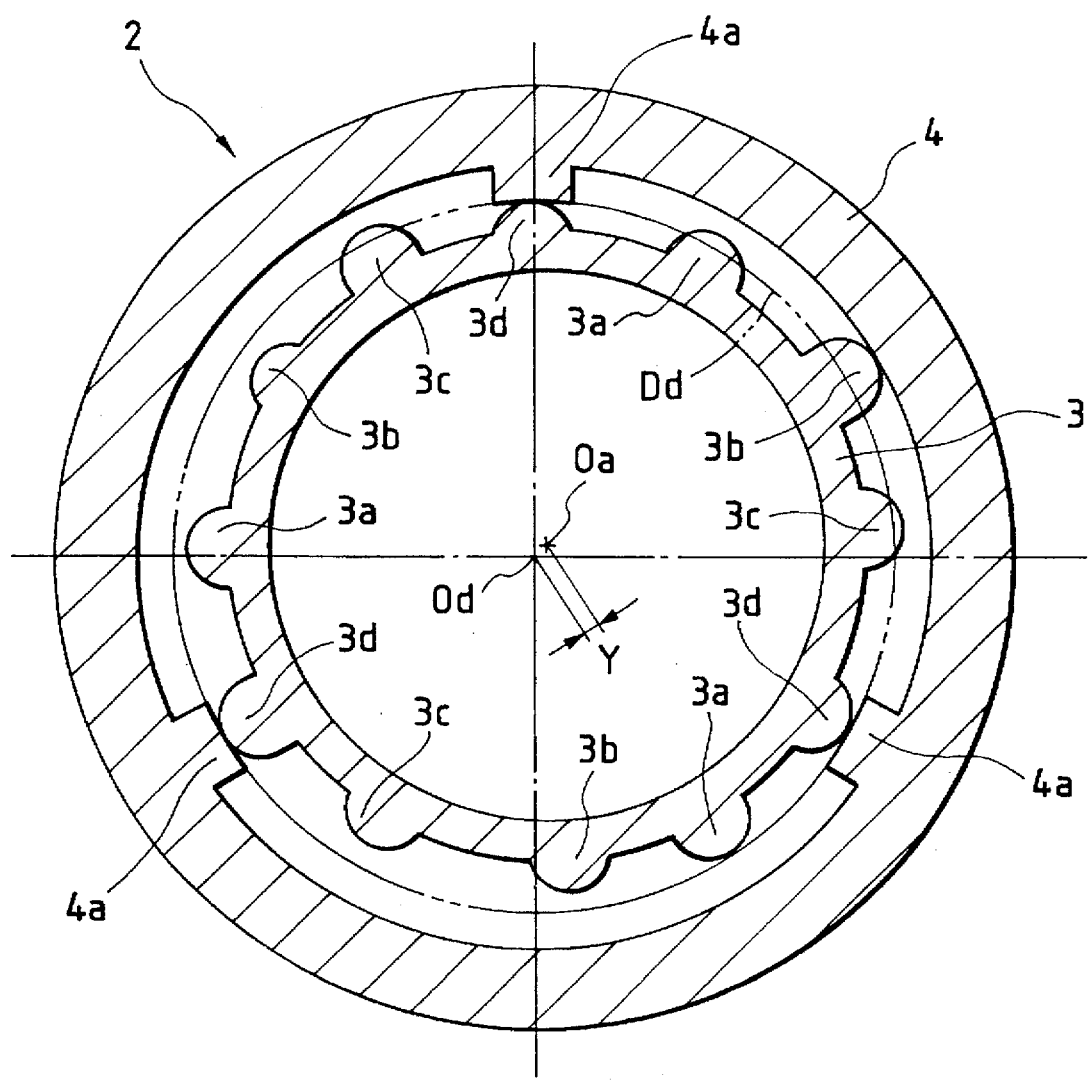

8 is a front view of the lens holding barrel 3 (a view showing the state when only the lens holding barrel 3 is seen from the direction of arrow B in FIG. 2), and FIG. 9 is a front view of the containing barrel 4 (a view showing the state when only the containing barrel 4 is seen from the direction of arrow B in FIG. 2). Also, in FIG. 10, there is shown a state in which the outwardly directed projections 3d have been selected. FIG. 10 is a cross-sectional view taken along the line III—III of FIG. 2 when the outwardly directed projections 3d bear against the inwardly directed protections 4a.

As shown in FIG. 10, the center Oa of the optical axis has slightly moved from the position of FIG. 3. This eccentricity amount (Y) differs from one group to another of the outwardly directed projections 3a–3d. As regards the eccentricity amount of each group, one which is high in the probability with which the adjustment of eccentricity becomes possible (the probability with which the reflected images P1 and P2 are made to coincide with each other) is adopted. Specifically, a lens barrel of substantially the same type as the present lens barrel (but having not the eccentricity adjusting mechanism of the present invention) was prepared as the object of test, and the monitoring of FIG. 7 was repetitively effected to this object of test, and data with the design value added to each of those actually measured values was calculated. Four eccentricity amounts which were high in the probability of occurrence were extracted from this data.

Next, in the state of FIG. 10 (or FIGS. 8 and 9), the reflected images P1 and P2 are monitored, and if these images coincide with each other, positioning is regarded as having been completed. After the completion of positioning, the lens holding barrel 3 is fixed to the containing barrel 4 by a method similar to that previously described.

Thus, according to the present embodiment, the adjustment of the eccentricity of the lens barrel can be carried out simply by selecting the outwardly directed projections in each group in succession. Also, the positioning of the lens is done by each inwardly directed projection bearing against the corresponding outwardly directed projection and therefore, the accuracy of positioning is markedly improved as compared with the conventional eccentricity adjustment in which the lens itself moves relative to the lens holding barrel.

When there is not the optimum group among the groups, the following work is done.

Figure 12:
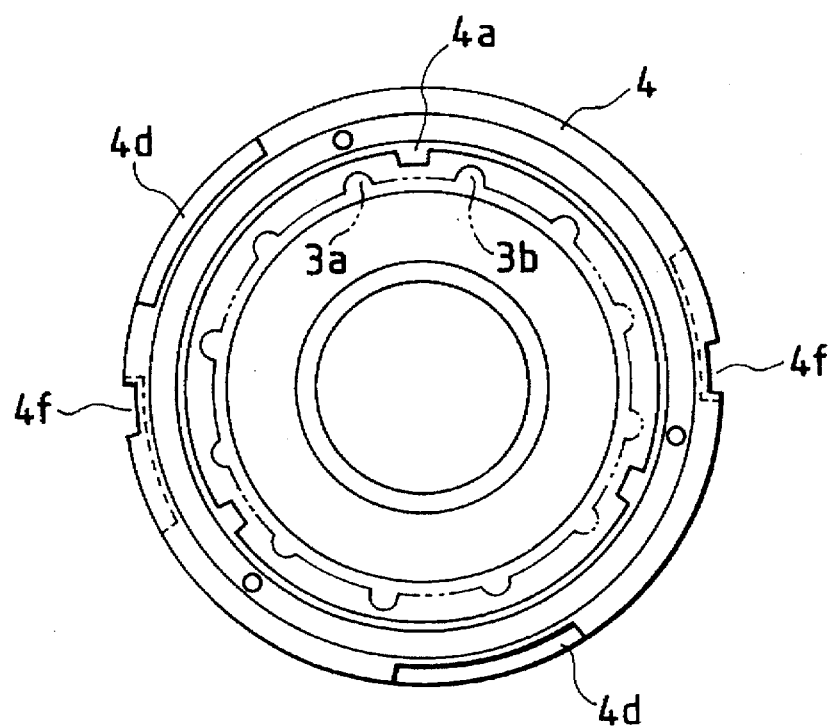
FIG. 12 is a front view of the containing barrel 4 when the inwardly directed projections 4a lie between adjacent ones of the outwardly directed projections 3a and 3b.
Figure 13:
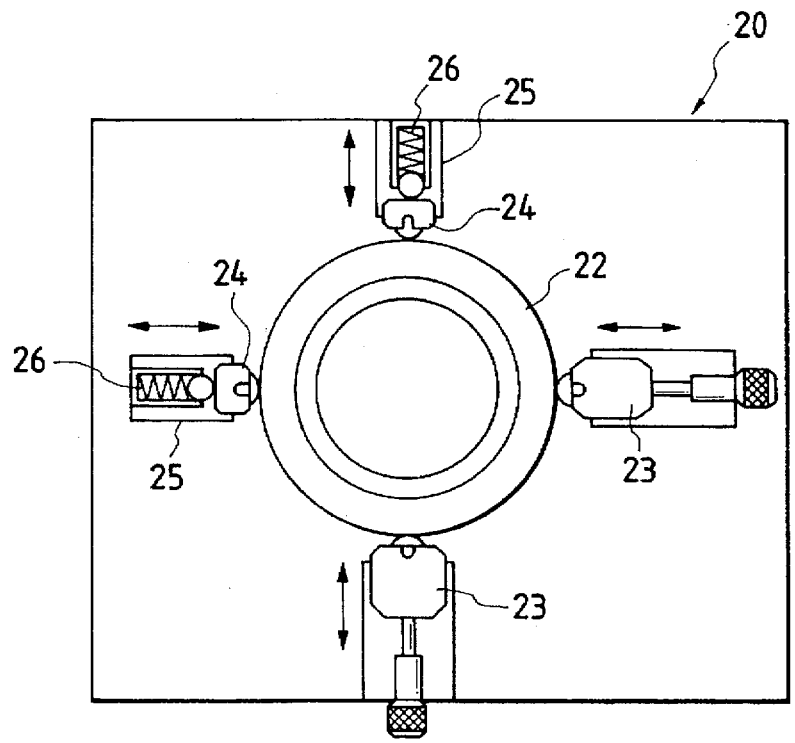
FIG. 13 is a plan view showing an example of the adjusting device of the lens barrel according to the present invention.
Figure 14:
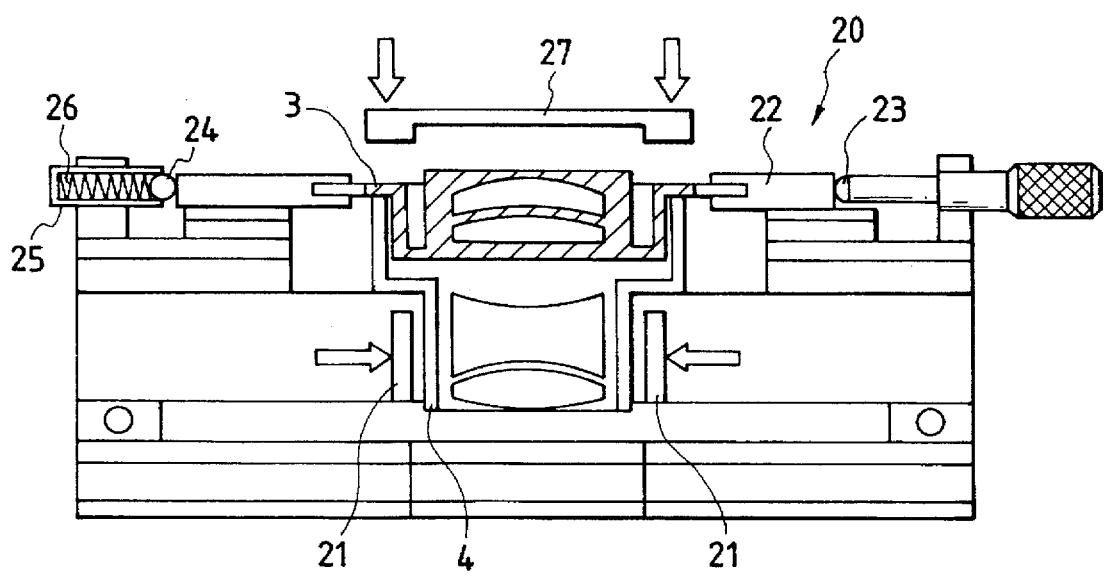
FIG. 14 is a construction view showing an example of the adjusting device of the lens barrel according to the present invention.

In the present embodiment, the circumferential interval Z between adjacent ones of the outwardly directed projections is set to a value greater than the circumferential width X of each inwardly directed projection 4a (see FIGS. 11 and 12), and here, each inwardly directed projection 4a is disposed between adjacent ones of the outwardly directed projections 3a and 3b. With this positional relation kept, the lens holding barrel 3 and the containing barrel 4 are set on an adjusting apparatus 20 (see FIGS. 13 and 14). At this time, the outer peripheral surface of the containing barrel 4 is held down by a block 21. Also, the lens holding barrel 3 is disposed while being sandwiched between two pairs of fine adjusting mechanisms through a holder 22. Each fine adjusting mechanism is comprised of a micrometer head 23 finely movable back and forth in response to a manual operation, and a movable member 24 movable back and forth in accordance with the movement of the micrometer head 23 while bearing against the holder 22. A spring 26 is contained in a body 25. The spring 26 applied to the movable member 24 such a force that pushes the movable member 24 out of the body 25.

Figure 11:
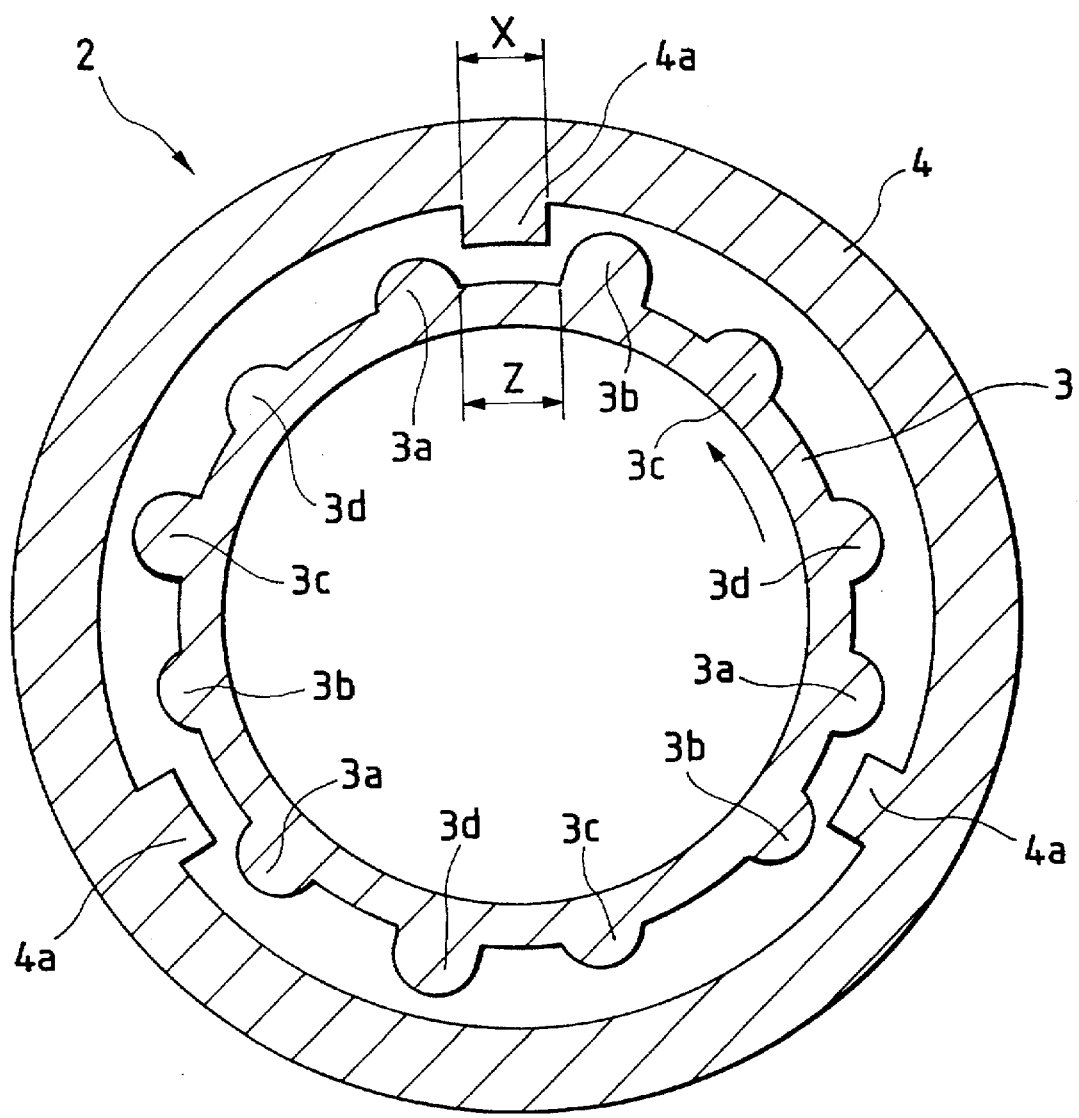
FIG. 11 is a cross-sectional view of the eccentricity adjusting mechanism 2 taken along the line III—III of FIG. 2 when the inwardly directed projections 4a lie between adjacent ones of the outwardly directed projections 3a and 3b.

After the lens holding barrel 3 and the containing barrel 4 are set on the adjusting apparatus 20, the micrometer head 23 is finely moved and the lens holding barrel 3 is moved in a horizontal direction. At this time, the reflected images P1 and P2 are monitored by the method shown in FIG. 7. The outwardly directed projections 3a–3d of the lens holding barrel 3 and the inwardly directed projections 4a of the containing barrel 4 are in a free state without bearing against one another, as shown in FIG. 11 (FIG. 12), and therefore they do not hinder the horizontal movement of the lens holding barrel 3. If the lens holding barrel 3 is horizontally moved and the reflected images P1 and P2 are coincident with each other, positioning is regarded as having been completed. After the completion of positioning, the lens holding barrel 3 is fixed to the containing barrel 4 by two kinds of adhesive agents similar to those previously described. This fixing work is done with the lens holding barrel 3 pressed toward the containing barrel 4 side by a pressing jig 27.

Thus, in the present embodiment, free eccentricity adjustment which does not resort to the combination of the outwardly directed projections and the inwardly directed projections is also possible.

The general construction of the lens barrel of the present embodiment will now be described.

In FIG. 1, the reference numeral 6 designates a fixed mount for mounting the present lens barrel on a camera body. The reference numeral 7 denotes a fixed barrel made integral with the fixed mount 6. The reference character 7a designates rectilinearly moving keys provided on the inner peripheral surface of the fixed barrel 7, and disposed at three locations at circumferentially equal intervals. The reference characters 7b and 7c denote guide grooves formed in the outer peripheral portion of the fixed barrel 7 at a predetermined angle about the optical axis. The reference numeral 8 designates an operating ring for zooming rotatively operated during zooming. The reference character 8a denotes an inwardly directed pin provided on the inner peripheral surface of the operating ring 8 for zooming and engaged with the guide groove 7b of the fixed barrel 7. The pins 8a are disposed at three locations in the circumferential direction. The reference character 8b designates rectilinearly moving keys provided on the inner peripheral surface of the operating ring 8 for zooming and disposed at three locations at circumferentially equal intervals. The reference numeral 9 denotes an adjusting ring fixed to the operating ring 8 for zooming by an adhesive tape 10. The reference character 9a designates a female helicoid thread formed on the inner peripheral portion of the adjusting ring 9. The reference numeral 10 denotes a cam cylinder. A rectilinear guide groove 10a and a male helicoid thread 10b are formed on the outer peripheral portion of the cam cylinder 10. The rectilinearly moving keys 8b are engaged with this rectilinear guide groove 10a. The male helicoid thread 10b is in meshing engagement with the female helicoid thread 9a. The reference character 10c designates a cam projection provided on the fore end side of the cam cylinder 10. The reference character 10d denotes a concave cam slot formed in the inner peripheral portion of the cam cylinder 10. The reference numeral 11 designates a relay cylinder having cam followers 11a and 11b on the inner peripheral portion thereof and having a male helicoid thread 11c and a rectilinear guide groove 11d on the outer peripheral portion thereof. The reference numeral 12 denotes a lens holding barrel holding a lens unit L1 (lenses G1, G2 and G3). The reference character 12a designates a female helicoid thread formed on the inner peripheral portion of the lens holding barrel 12.

The reference character 12b denotes a rectilinear moving key formed on the rear end portion of the lens holding barrel 12. The reference numeral 13 designates a drive ring with which a drive gear, not shown, is in meshing engagement, and which is rotated about the optical axis by the rotational force of this drive gear. The reference character 13a denotes an interlocking key made integral with the drive ring 13. The reference numeral 13b designates a driving gear formed on the inner peripheral portion of the drive ring 13. The reference numeral 14 denotes a guide bar extending in the direction of the optical axis and fixed to the fixed barrel 7 by a screw 15. The reference numeral 4 designates the afore-described containing barrel. The reference character 4e denotes a cam follower provided on the outer peripheral surface of the containing barrel 4. The cam follower 4e is slidably fitted in the cam slot 10d of the cam cylinder 10. The reference character 4f designates a guide groove formed in the containing barrel 4. The guide groove 4f is slidably engaged by a guide bar 14. The reference numeral 3 denotes the aforedescribed lens holding barrel. The lens holding barrel 3 is formed with an escape groove 3f (not shown here) for permitting the escape of the guide bar 14. The reference numeral 16 designates a rubber ring put on the operating ring 8 for zooming and the adjusting ring 9 fixed by the adhesive tape 10.

In the lens barrel having structure, when the structure, when the operating ring 8 for zooming is rotatively operated, the adjusting ring 9 and cam cylinder 10 integral therewith rotate about the optical axis. When the cam projection 10c of the cam cylinder 10 rotates, the relay cylinder 11 is moved in the direction of the optical axis without being rotated, by the action of the cam followers 11a and 11b holding the cam projection 10c therebetween and of the rectilinear groove 11d engaged with the rectilinearly moving key 7a of the fixed barrel 7. The lens holding barrel 12 integral with the relay cylinder 11 is also moved in the same direction. The zooming of the lens unit L1 is effected by the movement of the lens holding barrel 12.

Also, the cam follower 4e of the containing barrel 4 is inserted in the cam slot 10d of the cam cylinder 10 and the guide bar 14 of the fixed barrel 6 is inserted in the guide groove 4f of the containing barrel 4 and therefore, with the rotation of the cam cylinder 10, the containing barrel 4 moves in the direction of the optical axis without rotating. The lens holding barrel 3 integral therewith also moves in the same direction. The zooming of the lens units L2 and L3 is effected by the movement of the containing barrel 4 and the lens holding barrel 3.

On the other hand, the lens unit L1 moves also during focusing. That is, the lens holding barrel 12, when a rotational force is applied thereto from the outside, moves while spirally rotating along the helicoid threads 12a and 11c. This rotational force is given from an operating ring for focusing, not shown, or the drive ring 13. The drive ring 13 is rotatable only about the optical axis by the guide groove 7c of the fixed barrel 7, and is rotated by the drive force of a motor for AF (auto focus), not shown.

Figure 15:
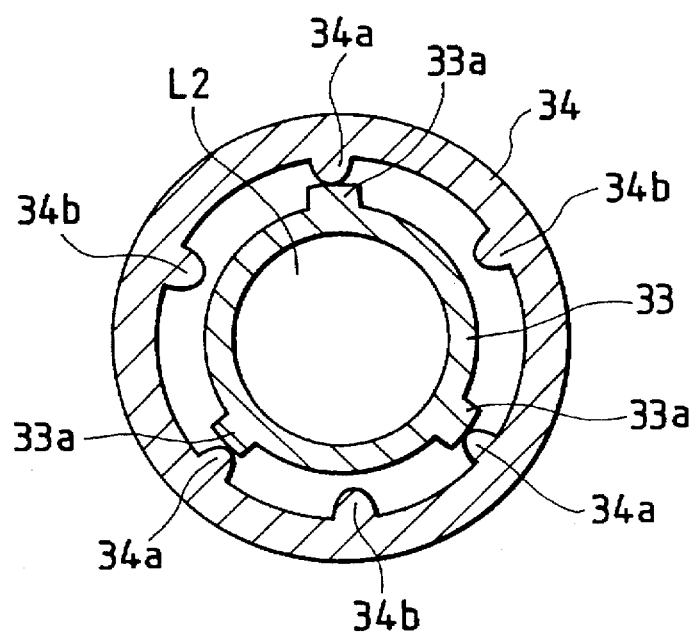
FIG. 15 is a construction view showing another embodiment of the eccentricity adjusting mechanism according to the present invention.

While an embodiment of the present invention has been described above, the eccentricity adjusting mechanism according to the present invention may also be constructed as shown in FIG. 15. In FIG. 15, a plurality of (three) outwardly directed projections 33a are provided on the outer peripheral surface of a lens holding barrel 33, and a plurality of (two) groups of the same number of (three) inwardly directed projections 34a, 34b as the plurality of outwardly directed projections 33a are provided on the inner peripheral surface of a containing barrel 34. The three outwardly directed projections 33a bear against the inwardly directed projections (here, the three inwardly directed projections 34a) included in any one of the aforementioned plurality of groups at a time to thereby position the optical axis of the lens unit L2. Virtual circles inscribed on the inwardly directed projections included in respective ones of the aforementioned groups are circles of the same size in a plane perpendicular to the optical axis, and the centers of the virtual circles differ from one another.

According to the present invention, highly accurate adjustment of the eccentricity of the lens can be accomplished by simple work without the use of a large-scale apparatus.

What is claimed is:

1. A lens barrel including:

a lens holding barrel holding a lens;

a containing barrel containing said lens holding barrel therein;

a plurality of inwardly directed projections provided on the inner peripheral surface of said containing barrel; and a plurality of groups of outwardly directed projections provided on the outer peripheral surface of said lens holding barrel;

each of said plurality of groups of outwardly directed projections having the same number of said outwardly directed projections as the number of said inwardly directed projections;

said plurality of inwardly directed projections bearing against respective ones of said outwardly directed projections in one group at a time to position the optical axis of said lens;

virtual circles circumscribed on said outwardly directed projections in the respective groups having the same size in a plane perpendicular to said optical axis;

the centers of said virtual circles lying at different positions.

2. A lens barrel according to claim 1, wherein the circumferential interval between adjacent ones of said outwardly directed projections is greater than the circumferential width of said inwardly directed projections.

3. A lens barrel according to claim 1, wherein one of the centers of said virtual circles is on said optical axis of said lens.

4. A lens barrel including:

a lens holding barrel holding a lens;

a containing barrel containing said lens holding barrel therein;

a plurality of outwardly directed projections provided on the outer peripheral surface of said lens holding barrel; and a plurality of groups of inwardly directed projections provided on the inner peripheral surface of said containing barrel;

each of said plurality of groups of inwardly directed projections having the same number of said inwardly directed projections as the number of said outwardly directed projections;

said plurality of outwardly directed projections bearing against respective ones of said inwardly directed projections in one group at a time to position the optical axis of said lens;

virtual circles inscribed on said inwardly directed projections in the respective groups having the same size in a plane perpendicular to said optical axis;

the centers of said virtual circles lying at different positions.

5. A lens barrel according to claim 4, wherein the circumferential interval between adjacent ones of said inwardly directed projections is greater than the circumferential width of said outwardly directed projections.

6. A lens barrel according to claim 4, wherein one of the centers of said virtual circles is on said optical axis of said lens.

7. A lens barrel including:

a first barrel holding a first optical system;

a second barrel holding a second optical system and holding said first barrel therein;

at least three inwardly directed projections provided on the inner peripheral surface of said second barrel; and two or more groups of outwardly directed projections provided on the outer peripheral surface of said first barrel;

the respective groups of said outwardly directed projections having the same number of said outwardly directed projections as the number of said inwardly directed projections;

said inwardly directed projections bearing against respective ones of said outwardly directed projections in one group at a time to position the optical axis of said first optical system relative to the optical axis of said second optical system;

virtual circles circumscribed on said outwardly directed projections in the respective groups having the same diameter as that of a virtual circle inscribed on said inwardly directed projections;

the centers of said virtual circles circumscribed on said outwardly directed projections lying at different positions.

8. A lens barrel including:

a first barrel holding a first optical system;

a second barrel holding a second optical system and holding said first barrel therein;

at least three outwardly directed projections provided on the outer peripheral surface of said first barrel; and two or more groups of inwardly directed projections provided on the inner peripheral surface of said second barrel;

the respective groups of said inwardly directed projections having the same number of said inwardly directed projections as the number of said outwardly directed projections;

said outwardly directed projections bearing against respective ones of said inwardly directed projections in one group at a time to position the optical axis of said first optical system relative to the optical axis of said second optical system;

virtual circles inscribed on said inwardly directed projections in the respective groups having the same diameter as that of virtual circles circumscribed on said outwardly directed projections;

the centers of said virtual circles inscribed on said inwardly directed projections lying at different positions.

\* \* \* \* \*